(12) United States Patent
Lange et al.

(10) Patent No.: US 8,070,120 B2
(45) Date of Patent: Dec. 6, 2011

(54) VERTICAL MOTION PENDANT ARM

(75) Inventors: Timothy G. Lange, Champlin, MN (US); Ronald Mathew Wacker, Foreston, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 194 days.

(21) Appl. No.: 12/622,323

(22) Filed: Nov. 19, 2009

(65) Prior Publication Data
US 2010/0127144 A1   May 27, 2010

Related U.S. Application Data

(60) Provisional application No. 61/116,234, filed on Nov. 19, 2008.

(51) Int. Cl.
*E04G 3/00*   (2006.01)
(52) U.S. Cl. .................................. 248/284.1; 248/282.1
(58) Field of Classification Search ............... 248/274.1, 248/276.1, 280.11, 281.11, 284.1, 292.11
See application file for complete search history.

(56) References Cited

U.S. PATENT DOCUMENTS

| | | | |
|---|---|---|---|
| 4,387,876 A | 6/1983 | Nathan | |
| 4,836,478 A | 6/1989 | Sweere | |
| D380,736 S | 7/1997 | Theis et al. | |
| 5,738,316 A | 4/1998 | Sweere et al. | |
| 5,743,503 A * | 4/1998 | Voeller et al. | 248/284.1 |
| 5,825,613 A | 10/1998 | Holden | |
| 5,842,672 A | 12/1998 | Sweere et al. | |
| 5,876,008 A | 3/1999 | Sweere et al. | |
| D412,161 S | 7/1999 | Theis et al. | |
| 5,918,841 A | 7/1999 | Sweere et al. | |
| 5,924,665 A | 7/1999 | Sweere et al. | |
| D413,110 S | 8/1999 | Sweere et al. | |
| 5,947,429 A | 9/1999 | Sweere et al. | |
| 5,967,479 A | 10/1999 | Sweere et al. | |
| 5,992,809 A | 11/1999 | Sweere et al. | |
| 6,012,693 A | 1/2000 | Voeller et al. | |
| 6,015,120 A | 1/2000 | Sweere et al. | |
| 6,019,332 A | 2/2000 | Sweere et al. | |
| D423,745 S | 4/2000 | Theis et al. | |
| 6,076,785 A | 6/2000 | Oddsen, Jr. | |
| 6,113,046 A | 9/2000 | Wang | |
| D431,736 S | 10/2000 | O'Brien et al. | |
| D435,852 S | 1/2001 | Oddsen, Jr. | |
| 6,179,263 B1 | 1/2001 | Rosen et al. | |
| 6,189,849 B1 | 2/2001 | Sweere et al. | |
| 6,233,791 B1 | 5/2001 | Theis | |
| 6,273,383 B1 | 8/2001 | Oddsen, Jr. | |

(Continued)

OTHER PUBLICATIONS

Strongarm, Inc.; Stainless Steel Vertica Pendant Arms and Encloses (Nema 4X); Publication 104391; 2005; Horsham, PA 19044.

*Primary Examiner* — Amy Sterling
*Assistant Examiner* — Erin W Smith
(74) *Attorney, Agent, or Firm* — Quarles & Brady LLP

(57) ABSTRACT

Embodiments of the invention provide a vertical motion pendant arm for supporting an enclosure at a desired height. The vertical motion pendant arm can include an enclosure mounting assembly, a support mounting assembly, and one or more connectors. The vertical motion pendant arm can also include a drawbridge mechanism having a rotatable worm, a rotatable gear that engages the rotatable worm, one or more drawbridge arms coupled to the rotatable gear, and one or more gas springs coupled to the drawbridge arms and the connectors. The gas springs can provide a counterforce to the enclosure.

18 Claims, 13 Drawing Sheets

U.S. PATENT DOCUMENTS

| | | |
|---|---|---|
| D450,903 S | 11/2001 | Wacker et al. |
| 6,354,549 B2 | 3/2002 | Sweere et al. |
| D455,916 S | 4/2002 | Fluhrer et al. |
| 6,380,484 B1 | 4/2002 | Theis et al. |
| 6,386,413 B1 | 5/2002 | Twyford |
| 6,409,134 B1 | 6/2002 | Oddsen, Jr. |
| 6,409,242 B1 | 6/2002 | Chang |
| 6,419,196 B1 | 7/2002 | Sweere et al. |
| 6,446,943 B1 | 9/2002 | Holden |
| 6,478,274 B1 | 11/2002 | Oddsen, Jr. |
| 6,499,704 B2 | 12/2002 | Oddsen, Jr. |
| 6,505,988 B1 | 1/2003 | Oddsen, Jr. |
| D477,325 S | 7/2003 | Theis et al. |
| D477,606 S | 7/2003 | Theis et al. |
| 6,609,691 B2 | 8/2003 | Oddsen, Jr. |
| 6,619,606 B2 | 9/2003 | Oddsen, Jr. et al. |
| D486,486 S | 2/2004 | Jobs et al. |
| 6,688,571 B1 | 2/2004 | Pauls |
| D487,893 S | 3/2004 | Jobs et al. |
| 6,719,253 B2 | 4/2004 | Oddsen, Jr. |
| 6,719,343 B2 | 4/2004 | Emerling et al. |
| 6,726,167 B2 | 4/2004 | Oddsen, Jr. |
| D489,370 S | 5/2004 | Jobs et al. |
| 6,736,364 B2 | 5/2004 | Oddsen, Jr. |
| D491,952 S | 6/2004 | Oddsen et al. |
| D492,893 S | 7/2004 | Oddsen, Jr. et al. |
| D494,971 S | 8/2004 | Jobs et al. |
| D495,332 S | 8/2004 | Jobs et al. |
| 6,783,105 B2 | 8/2004 | Oddsen, Jr. |
| D496,040 S | 9/2004 | Jobs et al. |
| 6,789,775 B2 | 9/2004 | Kringel et al. |
| 6,819,550 B2 | 11/2004 | Jobs et al. |
| 6,854,698 B2 | 2/2005 | Oddsen, Jr. |
| 6,863,344 B2 | 3/2005 | Smallhorn |
| 6,915,994 B2 | 7/2005 | Oddsen, Jr. |
| 6,935,883 B2 | 8/2005 | Oddsen, Jr. |
| D509,826 S | 9/2005 | Jobs et al. |
| D510,088 S | 9/2005 | Jobs et al. |
| D510,577 S | 10/2005 | Jobs et al. |
| 6,955,328 B2 | 10/2005 | Oddsen, Jr. |
| 6,976,738 B2 | 12/2005 | Sakamoto |
| 6,983,917 B2 | 1/2006 | Oddsen, Jr. |
| 6,986,489 B2 | 1/2006 | Oddsen, Jr. |
| 6,997,422 B2 | 2/2006 | Sweere et al. |
| 6,997,508 B2 | 2/2006 | Jaaska, Sr. |
| D518,063 S | 3/2006 | Piazza et al. |
| 7,014,157 B2 | 3/2006 | Oddsen |
| 7,017,874 B2 | 3/2006 | Oddsen, Jr. |
| 7,017,988 B2 | 3/2006 | Tornero et al. |
| 7,032,870 B2 | 4/2006 | Sweere et al. |
| D521,524 S | 5/2006 | Chang |
| 7,036,879 B2 | 5/2006 | Chang |
| 7,040,699 B2 | 5/2006 | Curran et al. |
| 7,044,546 B2 | 5/2006 | Chang |
| 7,044,568 B2 | 5/2006 | Olivera et al. |
| 7,048,237 B2 | 5/2006 | Hubner et al. |
| 7,048,242 B2 | 5/2006 | Oddsen, Jr. |
| 7,059,574 B2 | 6/2006 | Oddsen, Jr. |
| 7,063,296 B2 | 6/2006 | Williams |
| 7,066,433 B2 | 6/2006 | Oddsen, Jr. |
| 7,084,932 B1 | 8/2006 | Mathias et al. |
| 7,096,560 B2 | 8/2006 | Oddsen, Jr. |
| 7,100,880 B2 | 9/2006 | Oddsen, Jr. |
| 7,121,514 B2 | 10/2006 | Twyford |
| 7,133,085 B2 | 11/2006 | Morita et al. |
| 7,136,280 B2 | 11/2006 | Jobs et al. |
| 7,182,301 B1 | 2/2007 | Oddsen, Jr. et al. |
| 7,192,090 B2 | 3/2007 | Sakamoto |
| 7,201,416 B2 | 4/2007 | Rist |
| D541,807 S | 5/2007 | Oddsen, Jr. et al. |
| D541,808 S | 5/2007 | Oddsen, Jr. et al. |
| 7,222,831 B2 | 5/2007 | Oddsen, Jr. et al. |
| D544,489 S | 6/2007 | Oddsen, Jr. et al. |
| 7,252,277 B2 | 8/2007 | Sweere et al. |
| 2007/0210109 A1 | 9/2007 | Wiemholt |

* cited by examiner

VERTICAL MOTION PENDANT ARM

RELATED APPLICATIONS

This application claims priority under 35 U.S.C. §119 to U.S. Provisional Patent Application No. 61/116,234 filed on Nov. 19, 2008, the entire contents of which is incorporated herein by reference.

BACKGROUND

Pendant arms are used in the electronics industry for mounting and/or positioning of electrical enclosures that include, for example, operator interface controls. Pendant arms can move vertically and/or horizontally and can be mounted to walls, ceilings, machines, etc. The repositioning of conventional pendant arms can be accomplished in a variety of different ways, such as with threaded bolts and sliding members, mechanical springs and custom frictional disks, or multiple pivoting bars and counterweight assemblies.

SUMMARY

Some embodiments of the invention provide a vertical motion pendant arm for supporting an enclosure at a desired height. The vertical motion pendant arm can include an enclosure mounting assembly, a support mounting assembly, and one or more connectors that couple the enclosure mounting assembly to the support mounting assembly. The vertical motion pendant arm can also include a drawbridge mechanism having a rotatable worm, a rotatable gear that engages the rotatable worm, one or more drawbridge arms coupled to the rotatable gear, and one or more gas springs coupled to the drawbridge arms and the connectors. The gas springs can provide a counterforce to the enclosure.

DETAILED DESCRIPTION

Figure 1:
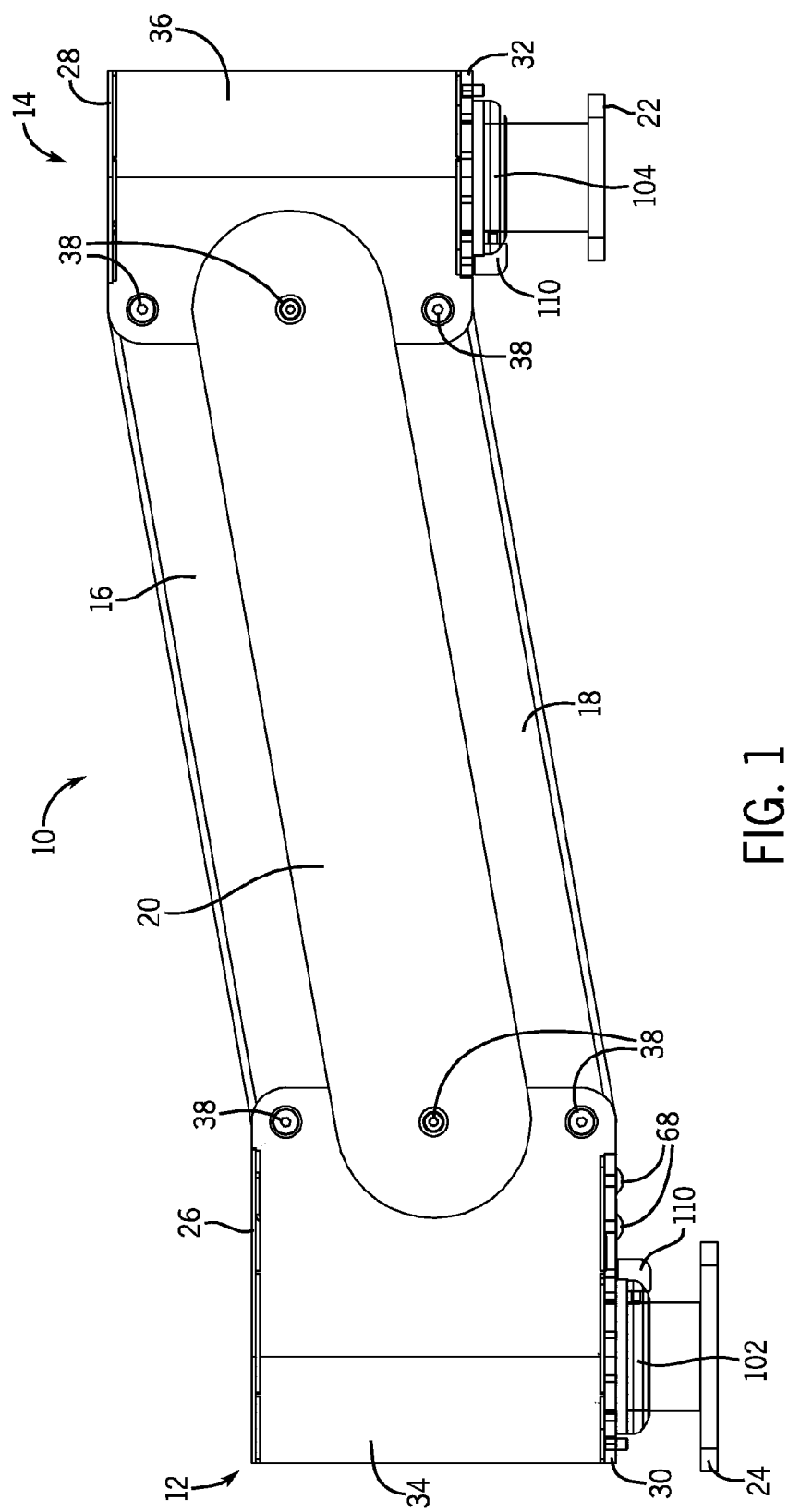
FIG. 1 is a side view of a vertical motion pendant arm according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a vertical motion pendant arm 10 according to one embodiment of the invention. The pendant arm 10 can include a support mounting assembly 12, an enclosure mounting assembly 14, a top connector 16, a bottom connector 18, and side panels 20. The top connector 16, the bottom connector 18, and the side panels 20 can form a connection channel between the support mounting assembly 12 and the enclosure mounting assembly 14.

In some embodiments, the pendant arm 10 can be used for mounting and adjusting the position of enclosures including small operator interface controls and/or instruments, such as human-machine interfaces (HMIs). The enclosure mounting assembly 14 can include an enclosure base 22 that can be coupled to an HMI. The support mounting assembly 12 can include a support base 24 that can be coupled to a support structure such as a machine, a wall, or a vertical pole. In some embodiments, the enclosure base 22 and/or the support base 24 can include additional attachments such as side-mount, top-mount, or pole-mount adaptors (not shown) to permit different coupling arrangements to the HMI and/or support structure. The support mounting assembly 12 and the enclosure mounting assembly 14 can each include a top cover 26, 28, a bottom cover 30, 32, and a side cover 34, 36, respectively. The top connector 16, the bottom connector 18, and the side panels 20 can be coupled to the support mounting assembly 12 and the enclosure mounting assembly 14 (e.g., at the side covers 34, 36) via fasteners 38 and can be rotatable about the fasteners 38 to allow vertical adjustment of the pendant arm 10. In some embodiments, all components of the pendant arm 10 can be constructed of steel, such as a mild steel or type 304 stainless steel. In addition, the pendant arm 10 can maintain NEMA type 4, type 4X, and type 12 ratings, as well as IEC (International Electrotechnical Commission) IP66 enclosure ratings. The pendant arm 10 can withstand high-pressure washdowns and the side panels 20 can be removable for access to clean the interior of the connection channel.

Figure 2:
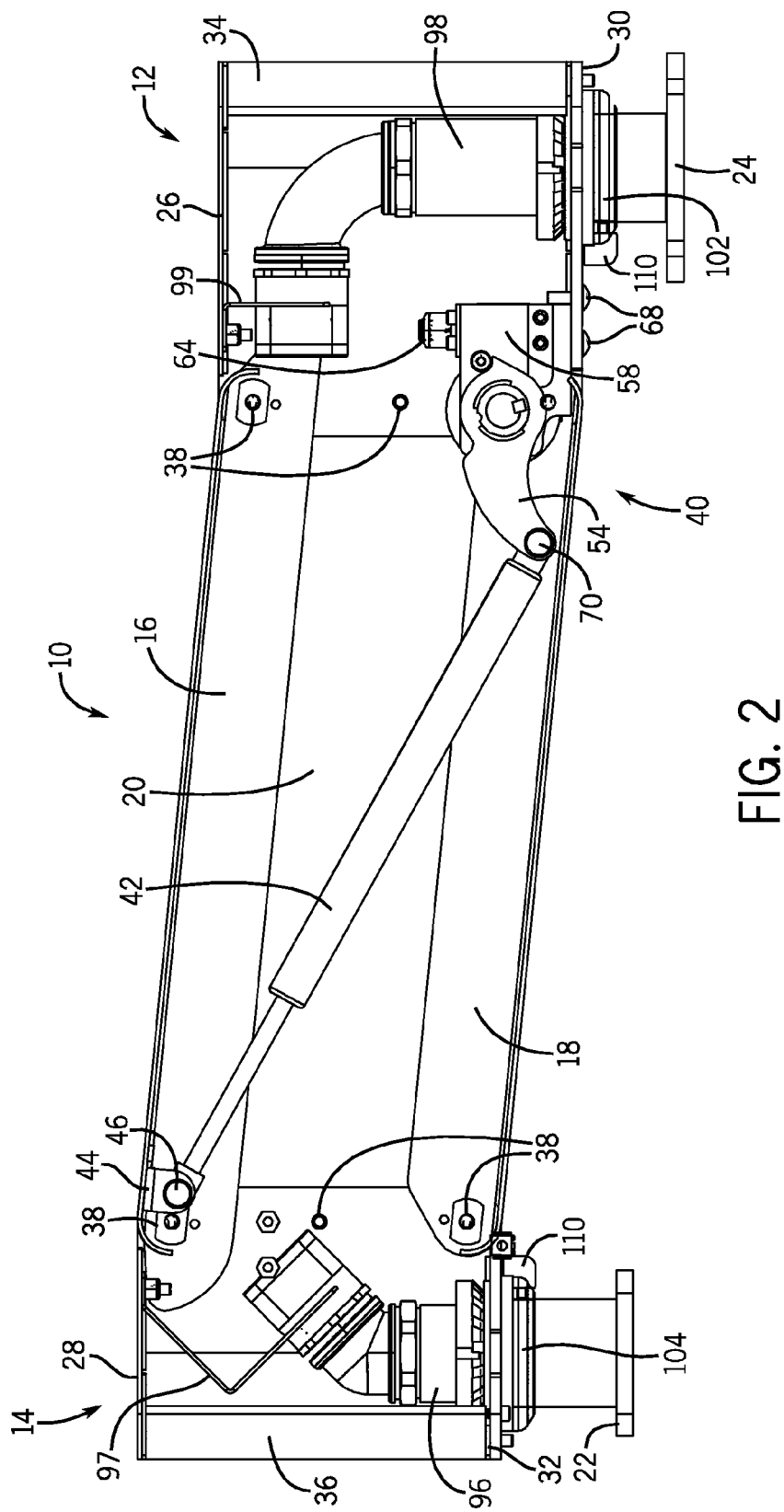
FIG. 2 is a side cross-sectional view of the vertical motion pendant arm of FIG. 1.

As shown in FIG. 2, the pendant arm 10 can include a drawbridge mechanism 40 and one or more gas springs 42 to support the weight of an HMI coupled to the pendant arm 10 and stabilize the pendant arm 10 at different positions. The drawbridge mechanism 40 can be positioned within or adjacent to the support mounting assembly 12 and can be coupled to one end of the gas springs 42. Another end of the gas springs 42 can be coupled to the top connector 16 via an attachment interface 44. The gas springs 42 can be coupled to the attachment interface 44 via pins 46 and can be rotatable about the pins 46.

Figure 3:
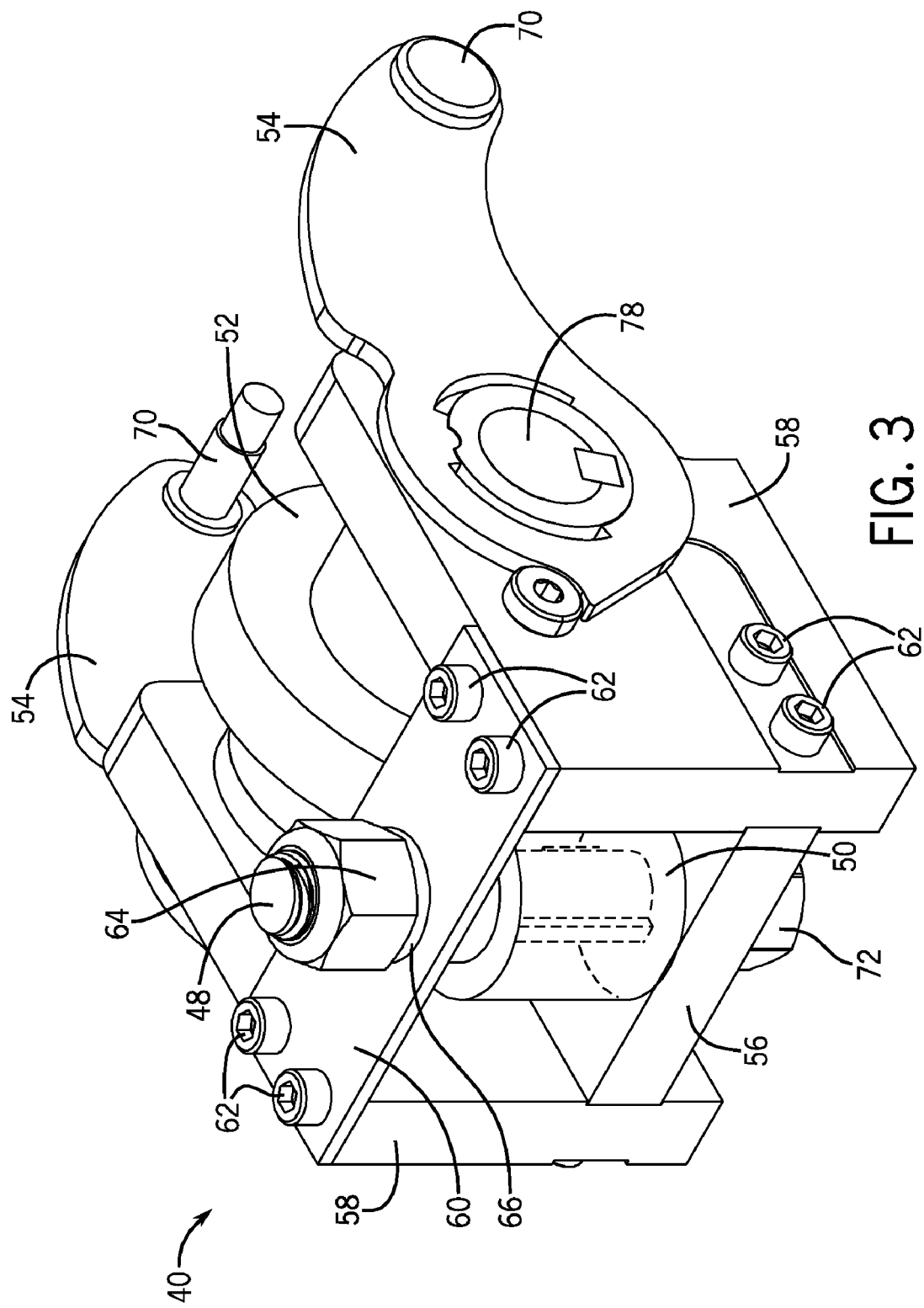
FIG. 3 is a perspective view of a drawbridge mechanism for use with the vertical motion pendant arm of FIG. 1.
Figure 4:
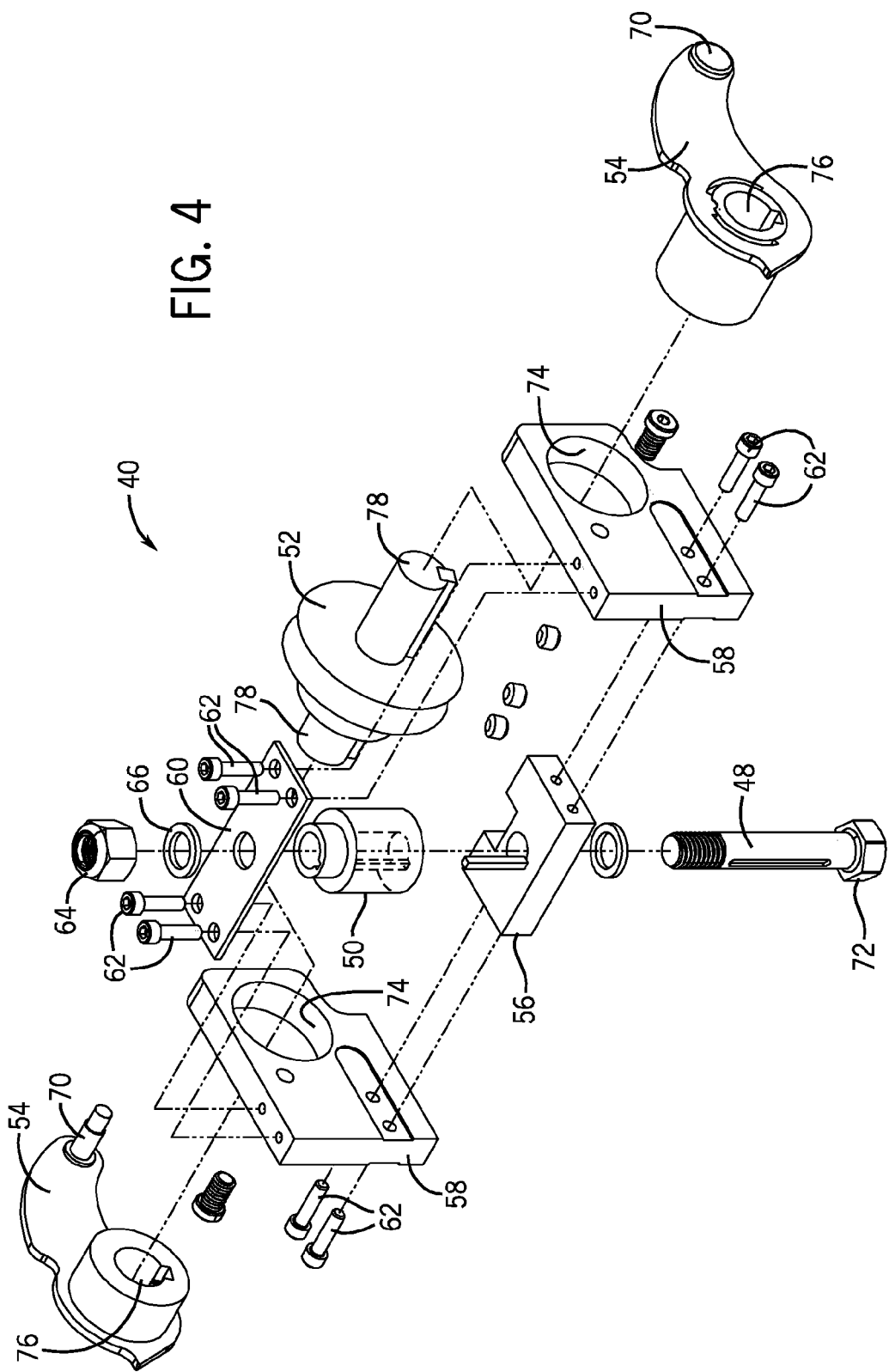
FIG. 4 is an exploded perspective view of the drawbridge mechanism of FIG. 3.

FIGS. 3 and 4 illustrate the drawbridge mechanism 40 according to one embodiment of the invention. The drawbridge mechanism 40 can include a vertical shaft 48, a worm 50, a gear 52, drawbridge arms 54, a bottom housing 56, side housings 58, and a top housing 60. The bottom housing 56, the side housings 58, and the top housing 60 can be coupled together with fasteners 62, as shown in FIGS. 3 and 4. The vertical shaft 48 can extend through the bottom housing 56, the worm 50, and the top housing 60 and can be secured on top by a nut 64 and a washer 66. The worm 50 can surround the shaft 48 so that rotation of the shaft 48 causes rotation of the worm 50. In some embodiments, the drawbridge mechanism 40 can be coupled to the support mounting assembly 12 via mounting fasteners 68 through a bottom portion of the side housings 58, as shown in FIG. 2.

Spring mounts 70 can be coupled to or integral with the ends of each drawbridge arm 54, as shown in FIGS. 3 and 4. The spring mounts 70 can permit attachment of one of the gas springs 42 to each drawbridge arm 28, as shown in FIGS. 1 and 2, and can serve as pivot points for the gas springs 42. When the pendant arm 10 is vertically adjusted, the gas springs 42 can provide a sufficient counterforce to support the weight of the load (e.g., the HMI coupled to the pendant arm 10) and keep the pendant arm 10 at a desired height. For example, if a user raises or lowers the HMI to a specific height, the pendant arm 10 can keep the HMI at that desired height without the use of a locking device.

Figure 5:
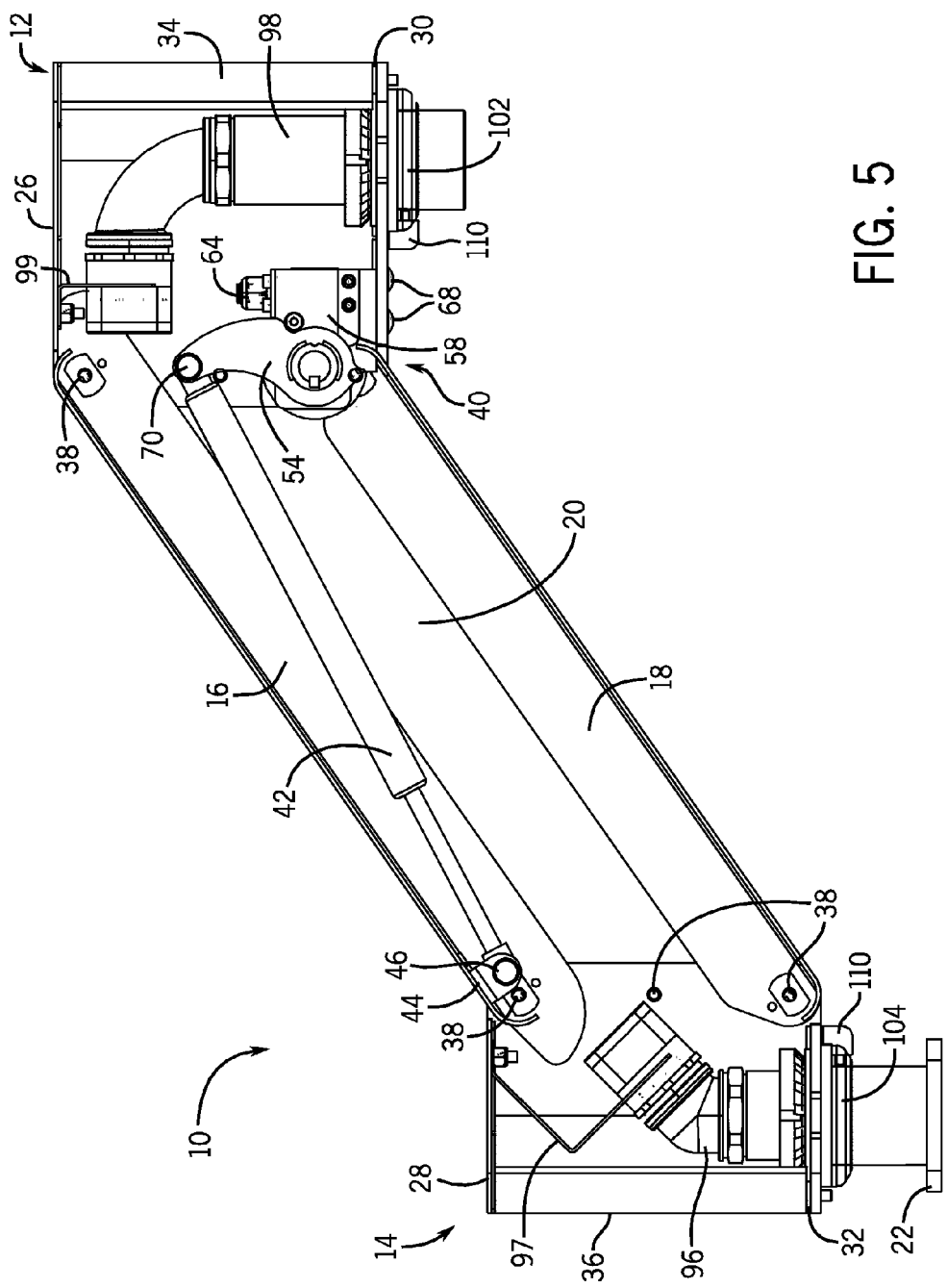
FIG. 5 is a side cross-sectional view of the vertical motion pendant arm of FIG. 1 in a first position.
Figure 6:
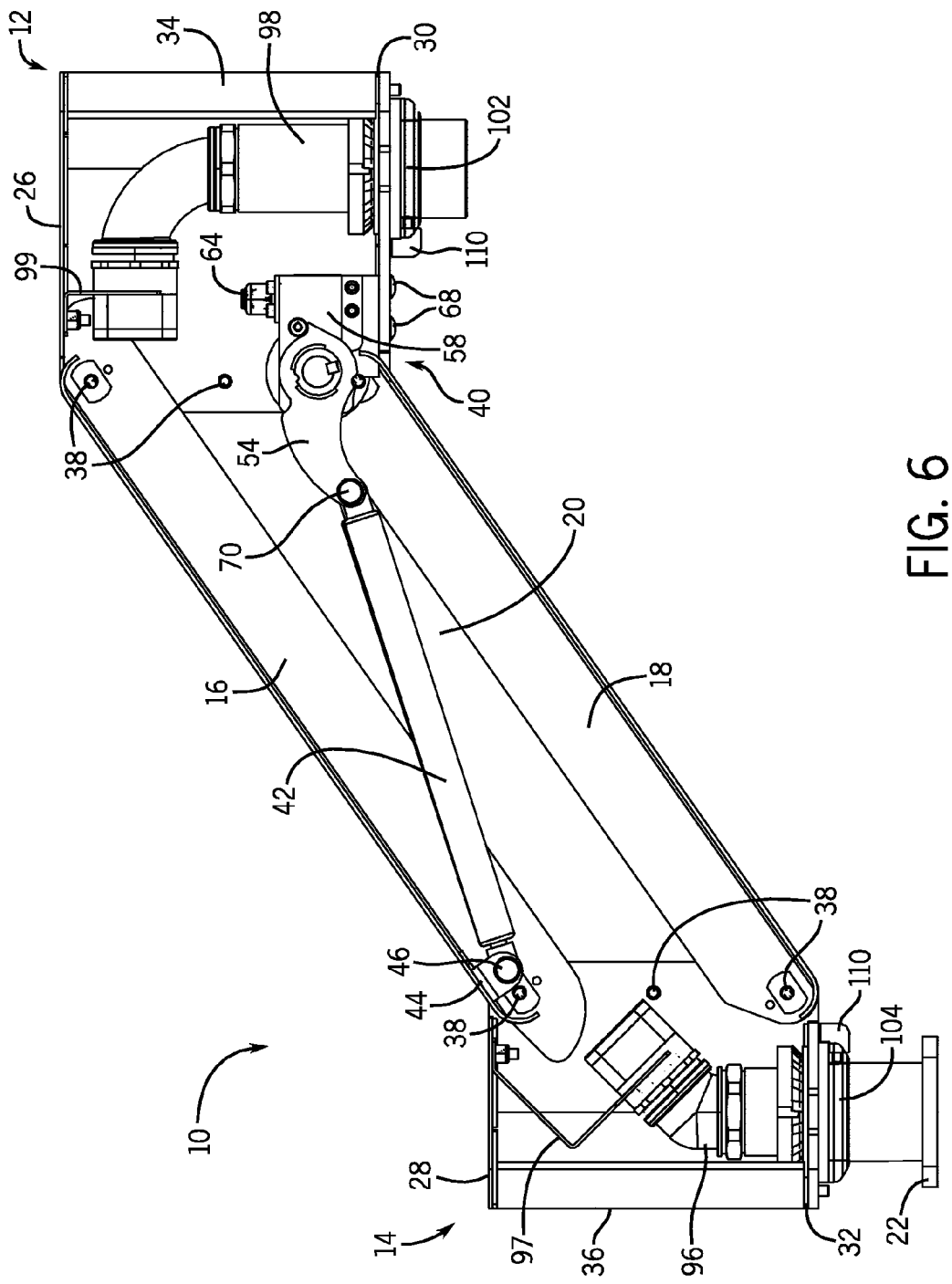
FIG. 6 is a side cross-sectional view of the vertical motion pendant arm of FIG. 1 in a second position.

The shaft 48 can include an adjustment interface 72 to allow a user to rotate the worm 50. The worm 50 can include teeth that engage teeth on the gear 52. As a result, when the worm 50 is rotated, the gear 52 can also rotate. As shown in FIG. 4, the drawbridge arms 54 can be inserted through holes 74 of the side housings 58 and can include keyholes 76 to engage extensions 78 of the gear 52. Accordingly, when the gear 52 is rotated, the drawbridge arms 54 can also rotate. The drawbridge arms 54 can be rotated to adjust the height of the pivot point of the gas springs 42, which can change the counterforce capable of being provided by the gas springs 42. More specifically, by adjusting the pivot point, the leverage that the gas springs 42 can have on a load can be adjusted. For example, as shown in FIG. 5, the drawbridge arms 54 can be at a maximum "up" position, which can be used for lighter loads. FIG. 6 shows the drawbridge arms 54 at a maximum "down" position, which can be used for heavier loads.

Figure 7:
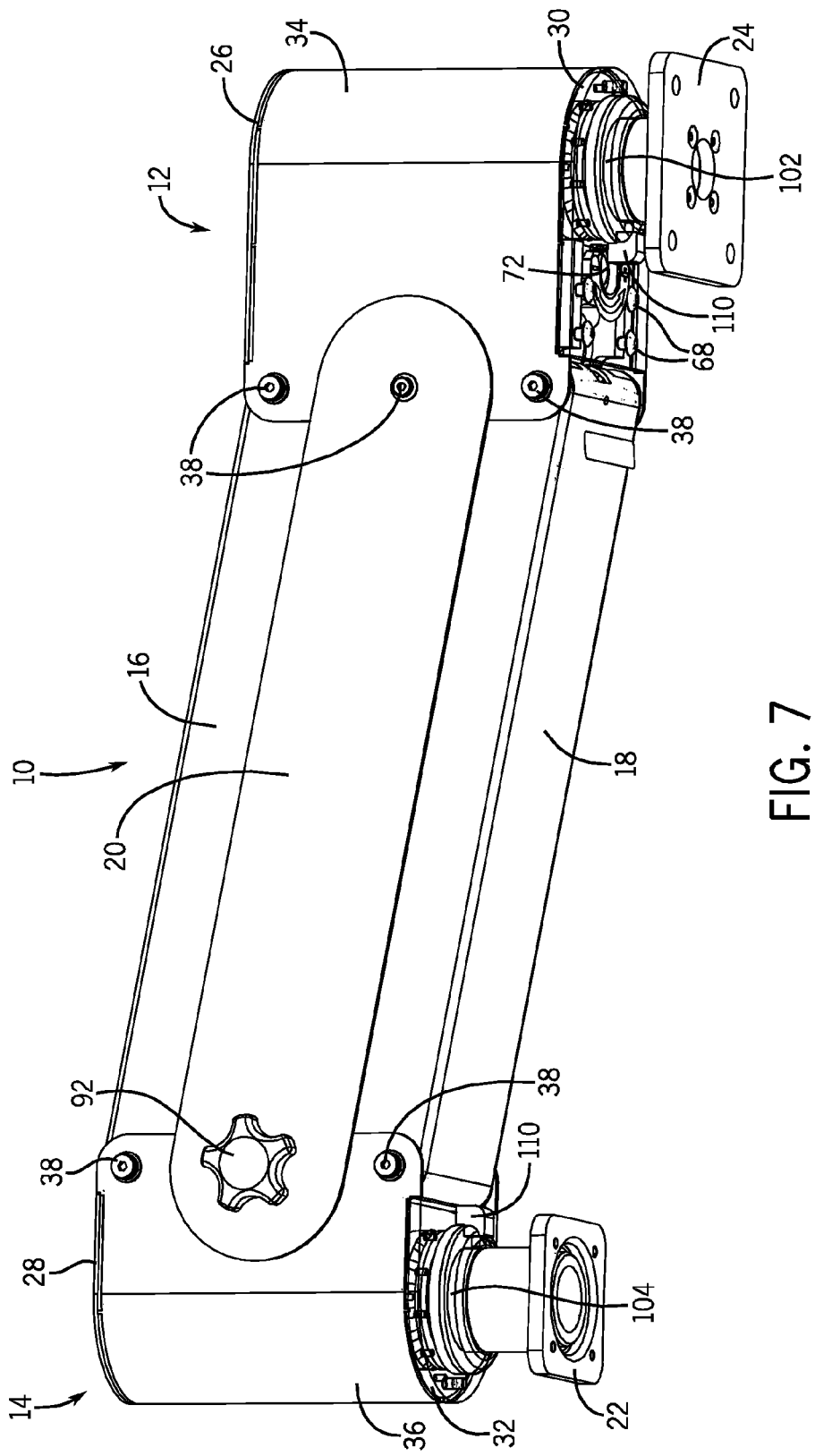
FIG. 7 is a bottom perspective view of the vertical motion pendant arm of FIG. 1.

As shown in FIGS. 3, 4, and 7, the adjustment interface 72 can be accessed from outside of the pendant arm 10 so that the user does not have to disassemble any components of the pendant arm 10 to adjust the drawbridge arms 54. For example, the adjustment interface 72 can be rotated using a common tool, such as a socket wrench. The adjustable drawbridge arms 54 and the easily accessible adjustment interface 72 can allow the pendant arm 10 to have different load capabilities that are field-adjustable. In one embodiment, the pendant arm 10 can have a connection channel length of about 26 inches, can support loads between about 45 pounds and about 125 pounds, and can be vertically adjusted up to about 13 inches. In another embodiment, the pendant arm 10 can have a connection channel length of about 36 inches, can support loads between about 25 pounds and about 75 pounds, and can be vertically adjusted up to about 20 inches.

Figure 8:
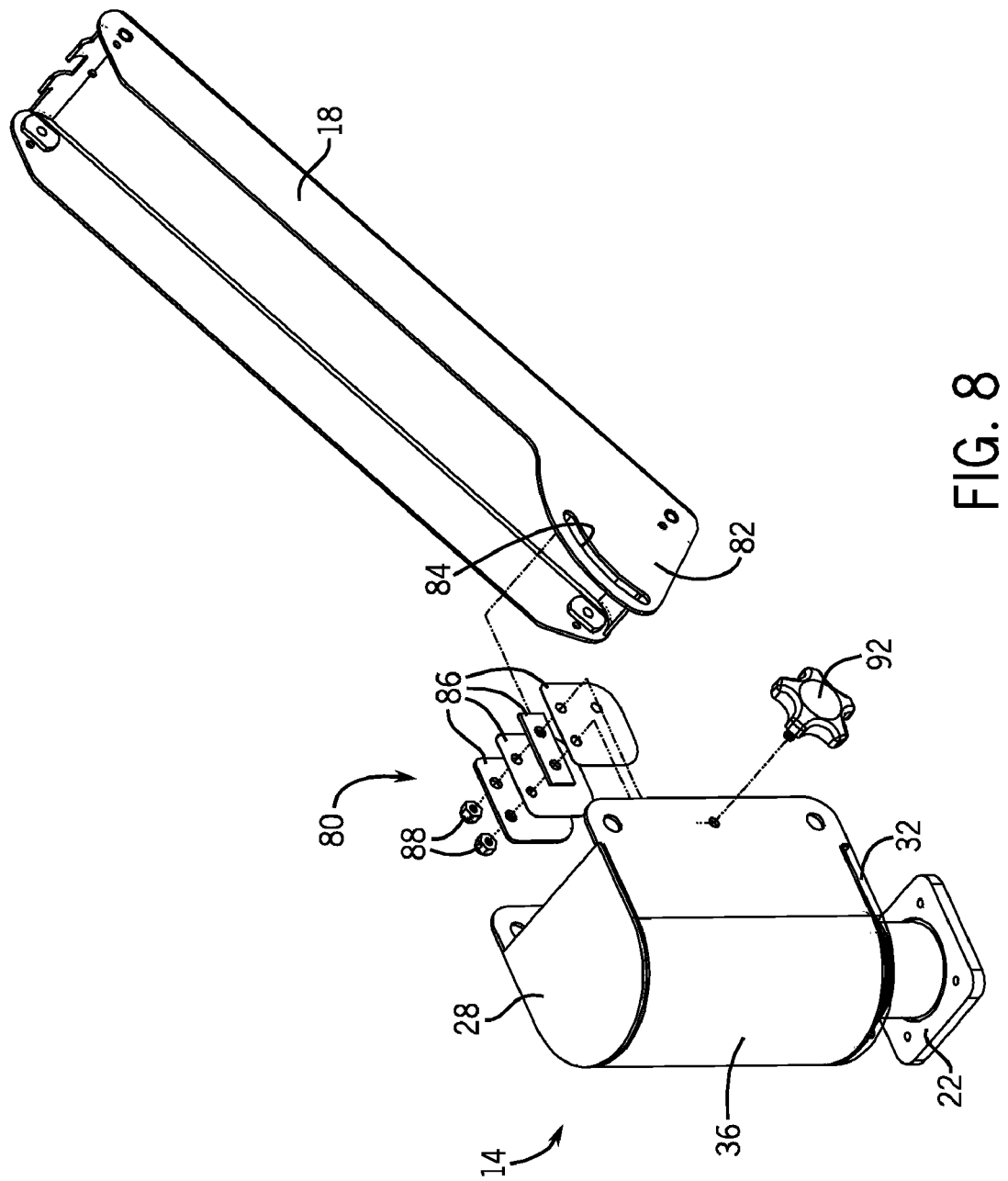
FIG. 8 is an exploded perspective view of a tension adjustment device for use with the vertical motion pendant arm of FIG. 1.
Figure 9:
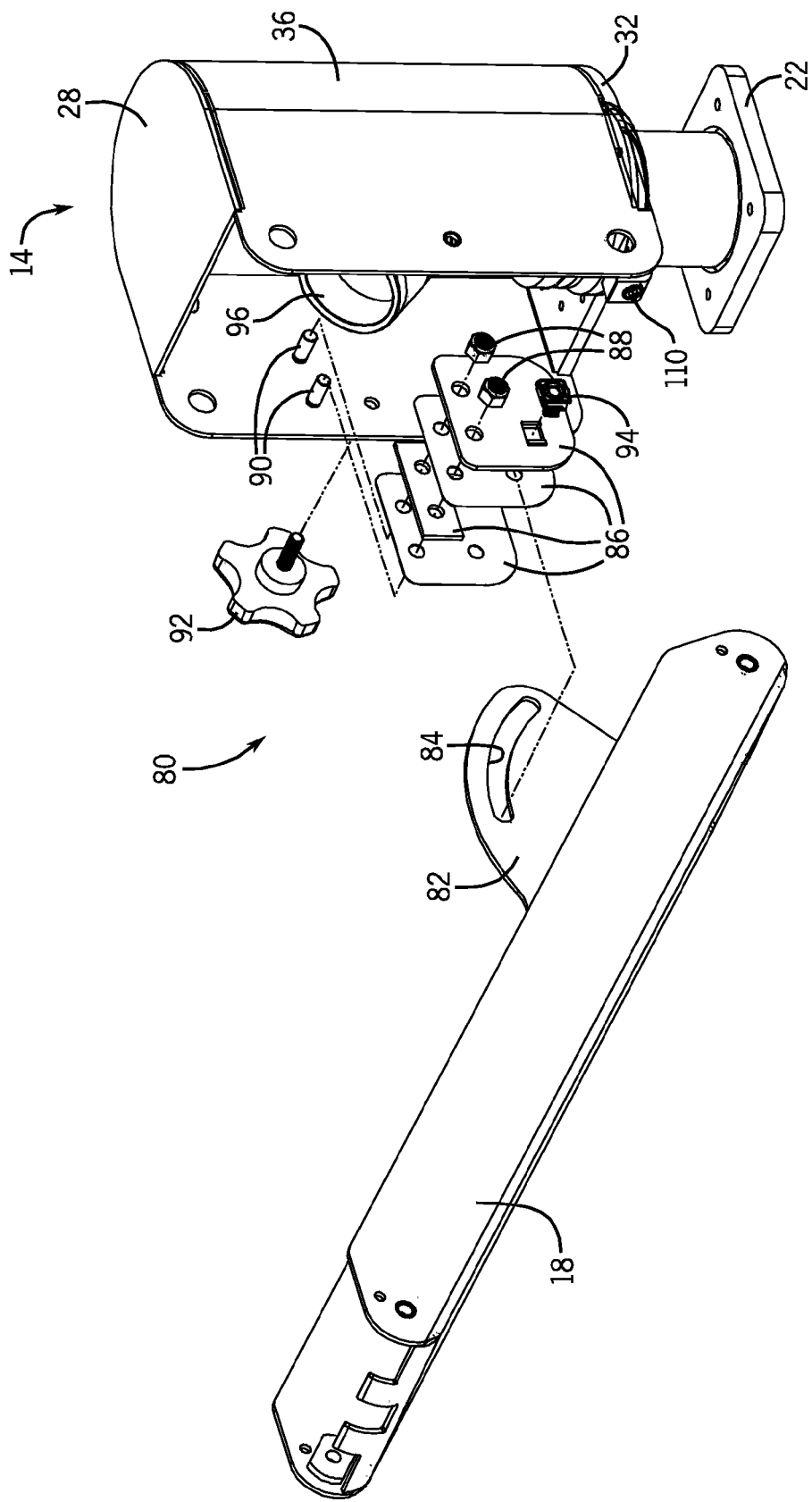
FIG. 9 is another exploded perspective view of the tension adjustment device of FIG. 8.

As shown in FIGS. 8-9, the pendant arm 10 can also include a tension adjustment device 80. The tension adjustment device 80 can be located at the enclosure mounting assembly 14. The bottom connector 18 can include an additional flap 82 on one side with a guide hole 84. The flap 82 can be positioned between a series of plates 86. The plates 86 can be coupled to the enclosure mounting assembly 14 via nuts 88 secured to protrusions 90 (a shown in FIG. 9) of the enclosure mounting assembly 14. An adjustment knob 92 (as shown in FIGS. 7-9) can be positioned through the plates 86 and the guide hole 84 and tightened against a bracket 94 (as shown in FIG. 9). By tightening the adjustment knob 92, the plates 86 can be forced toward each other against either side of the flap 82.

The tension adjustment device 80 can be adjusted to provide a desired resistance to movement of the bottom connector 18, as well as the entire pendant arm 10. In one example, when the pendant arm 10 is adjusted to a specific height, the gas springs 42 can have a tendency to creep up or down. The tightened plates 86 against the flap 82 can provide enough tension to resist the forces of the gas springs 42 and keep the pendant arm 10 at the desired height. The tension adjustment device 80 can be kept tighter when the pendant arm is positioned in areas where more resistance is needed, such as rooms where vibrations occur. Unlike conventional lock-and-release devices, the tension adjustment device 80 does not need to be loosened to reposition the pendant arm 10. In addition, the tension adjustment device 80 can provide a set range of motion for the pendant arm 10 by preventing the bottom connector 18 from moving when the adjustment knob 92 reaches either end of the guide hole 84.

Figure 10:
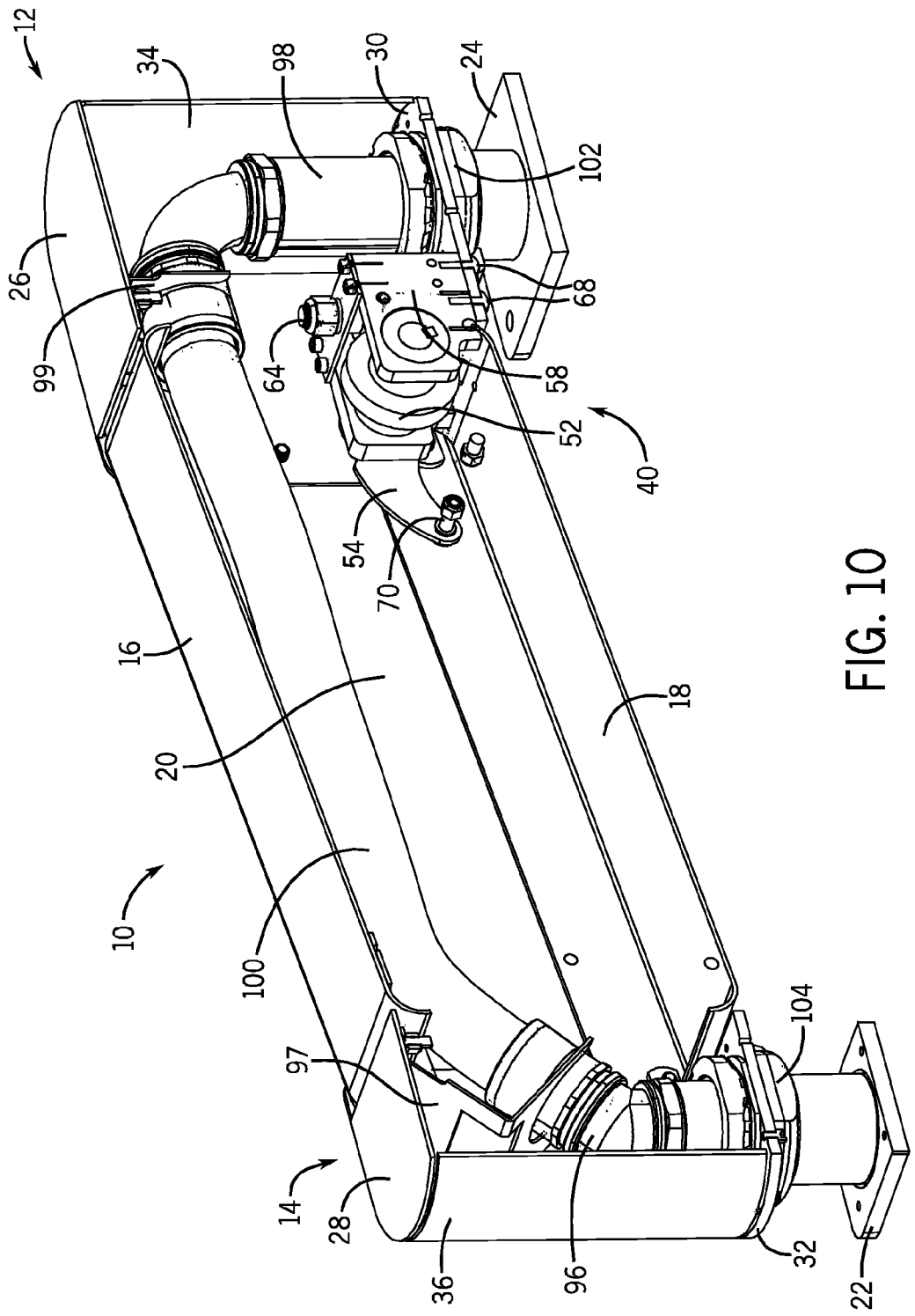
FIG. 10 is a perspective cross-sectional view of the vertical motion pendant arm of FIG. 1.

As shown in FIG. 10, the enclosure base 22 and the support base 24 can both be hollow and can have conduit attachments 96 and 98, respectively. As also shown in FIG. 10, a flexible electrical conduit 100 can be routed through the support base 24, the conduit attachment 98, the conduit attachment 96, and the enclosure base 22 in order to provide a continuous conduit pathway for cables or wires to the HMI with a single entry (e.g., at the support base 24) and a single exit (e.g., at the enclosure base 22). This continuous pathway can be Underwriters Laboratories® (UL)-rated from the single entry to the single exit. In one embodiment, the electrical conduit can be about 1.3 inches in diameter. In addition, in some embodiments, the pendant arm 10 can include support structures 97 and 99 for the conduit attachments 96 and 98, as shown in FIGS. 2, 5, 6, and 10.

Figure 11:
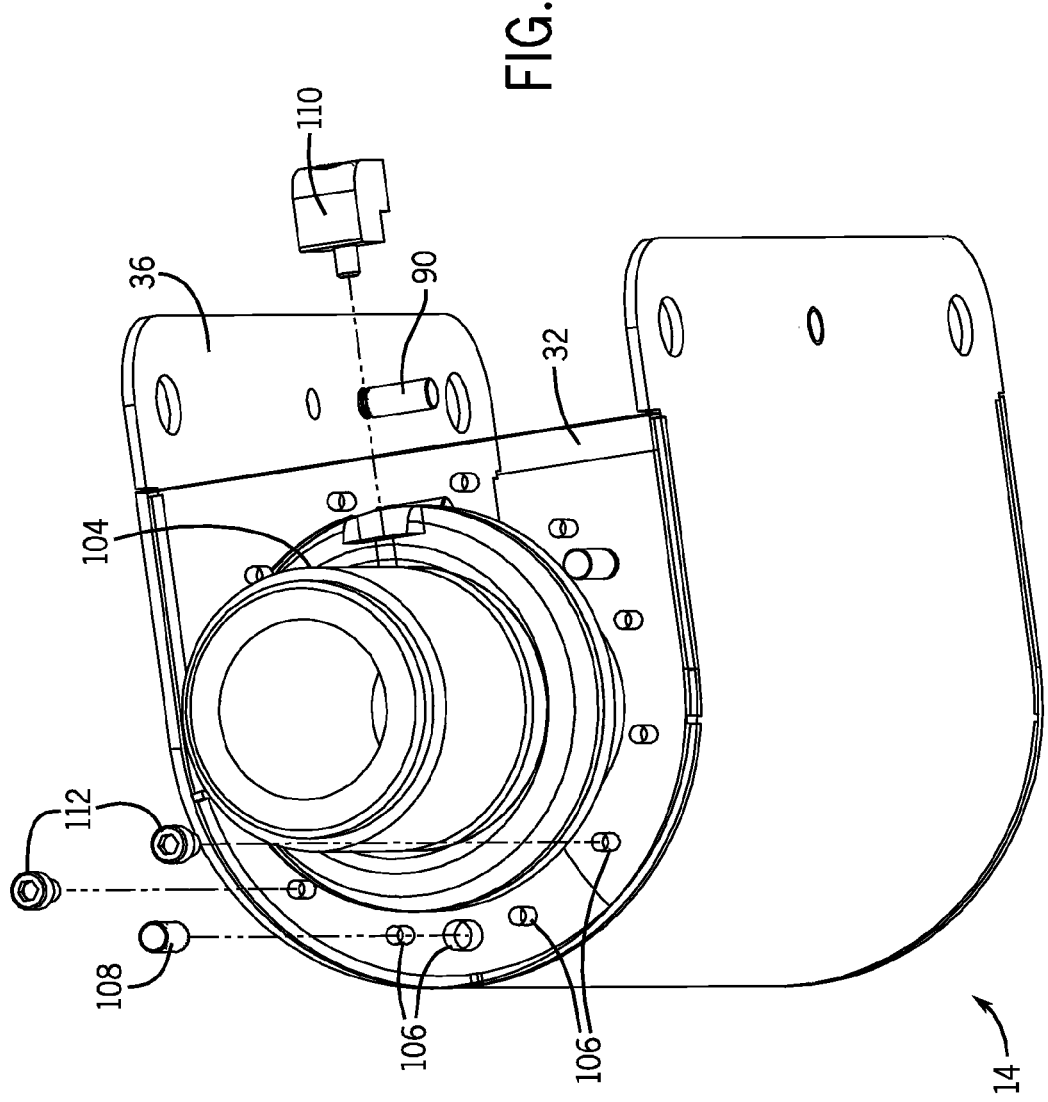
FIG. 11 is a perspective view of a rotation mechanism for use with the vertical motion pendant arm of FIG. 1.

The support mounting assembly 12 can rotate about the support base 24 via a rotation mechanism 102 (as shown in FIGS. 1, 2, 5-7, and 10) through the bottom cover 30 to provide lateral adjustment of the pendant arm 10. In addition, as shown in FIG. 11 (and FIGS. 1, 2, 6-7, and 10), the enclosure mounting assembly 14 can rotate about the enclosure base 22 via a rotation mechanism 104 through the bottom cover 32 to provide rotational adjustment of the HMI. Both bottom covers 30, 32 can include holes 106, for example, at 30-degree increments around the rotation mechanism. A peg 108 can be positioned in one of the holes 106 to engage a stop 110 when the rotation mechanism 102, 104 is rotated, preventing a full 360-degree rotation of the rotation mechanism 102, 104 (e.g., to prevent twisting of cables within the conduit 100). Accordingly, in some embodiments, both the rotation mechanisms 102, 104 can be rotated up to about 330 degrees. Additional screws 112 can be positioned in any of the holes 106 to set a desired range of rotation for the rotation mechanism 102, 104. Unlike conventional pendant arms, the screws 112 can be repositioned at any time to re-adjust rotation ranges without requiring disassembly of the pendant arm 10.

The support base 24 and the enclosure base 22 can be coupled to the rotation mechanisms 102, 104 via fasteners 114, as shown in FIG. 7.

Figure 12:
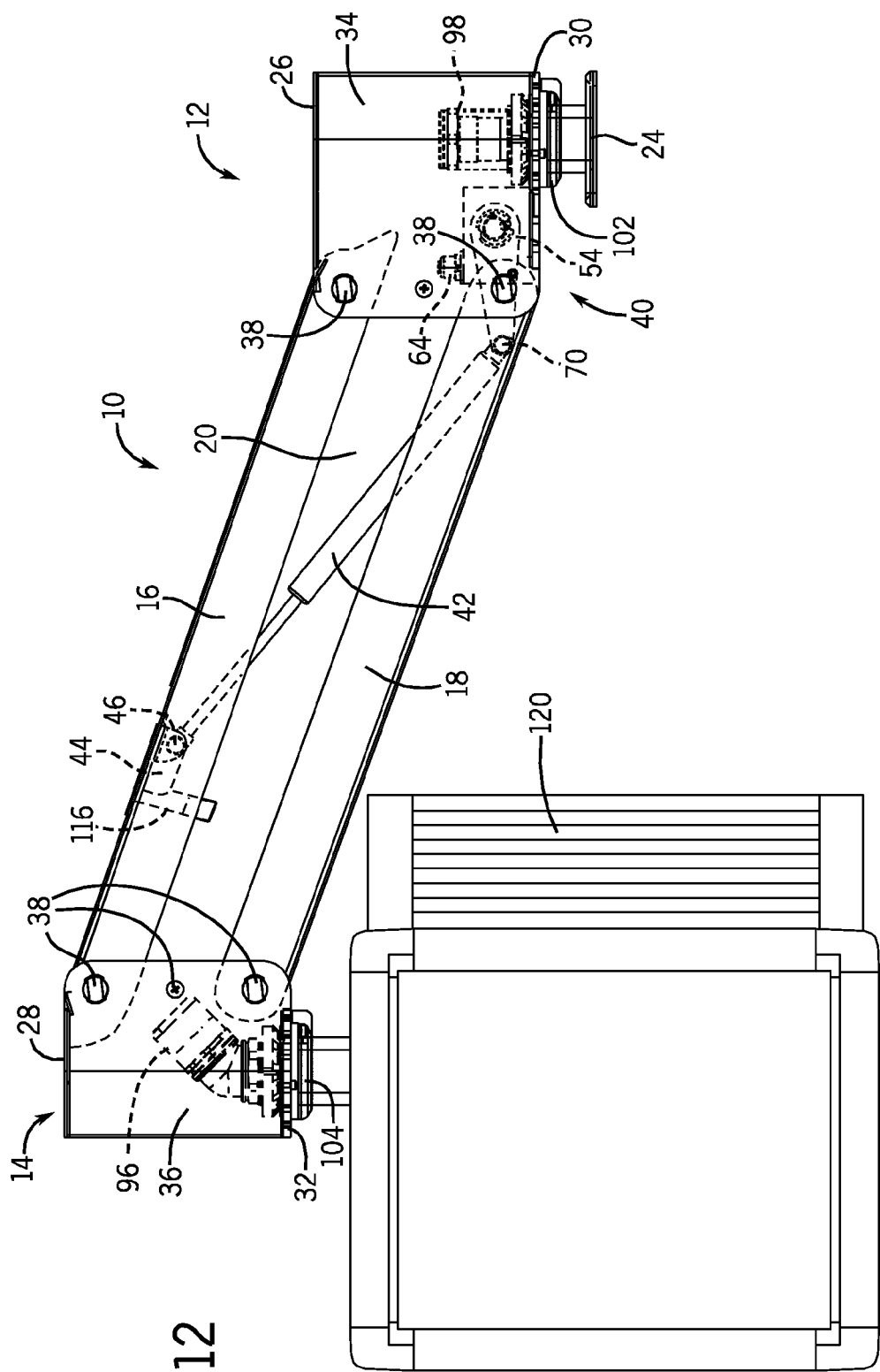
FIG. 12 is a perspective partial cross-sectional view of a vertical motion pendant arm according to another embodiment of the invention.
Figure 13:
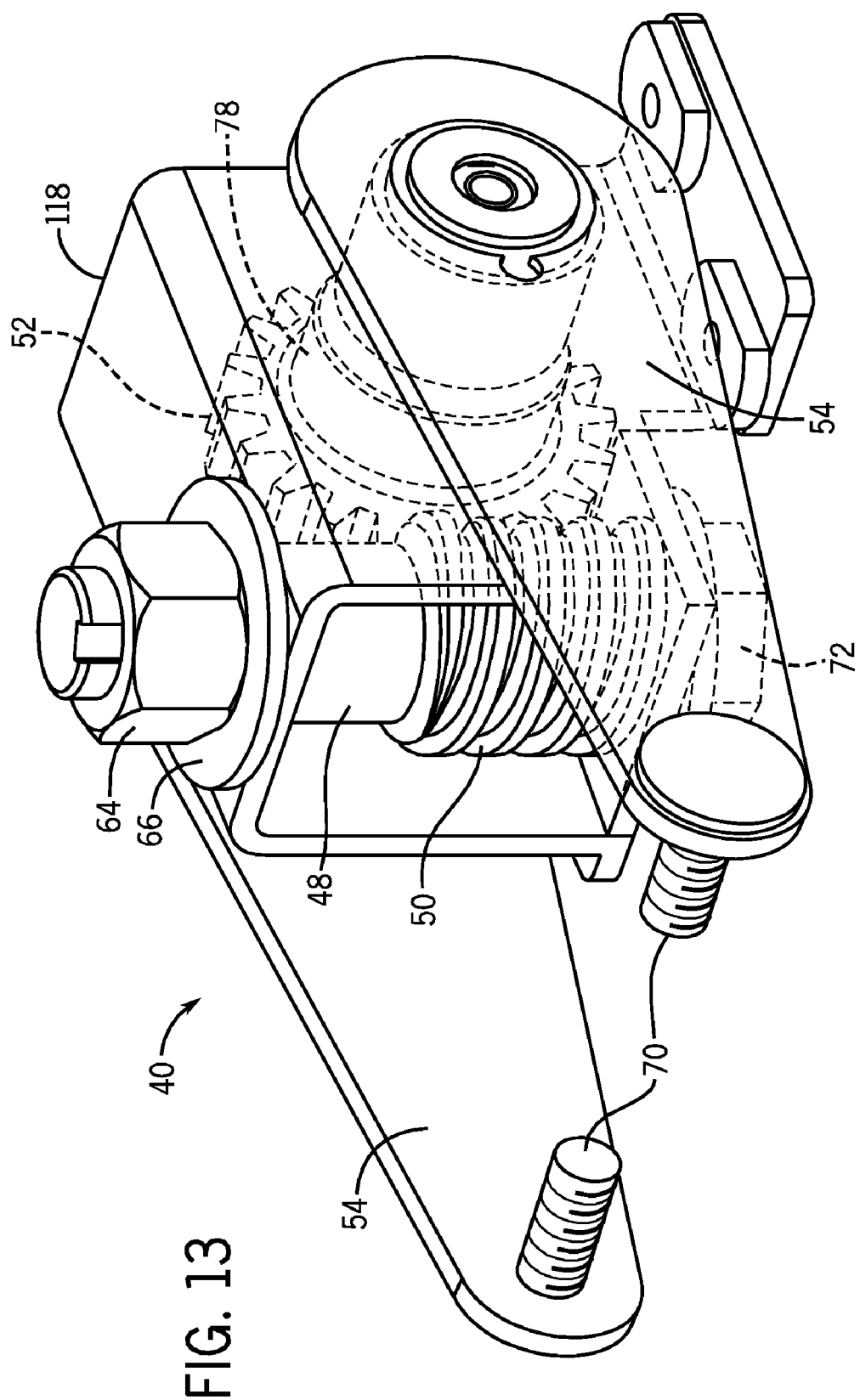
FIG. 13 is a perspective view of a drawbridge mechanism for use with the vertical motion pendant arm of FIG. 12.

FIGS. 12 and 13 illustrate the pendant arm 10 according to another embodiment of the invention. As shown in FIG. 12, the attachment interface 44 can include a hose guide 116 to support the conduit (not shown). In addition, the drawbridge mechanism 40 of FIGS. 12 and 13 can include an integrated housing 118 and the worm 50 can be positioned in front of the gear 52. FIG. 12 also illustrates an HMI 120 coupled to the enclosure base 22.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A vertical motion pendant arm for supporting an enclosure at a desired height, the vertical motion pendant arm comprising:
    an enclosure mounting assembly;
    a support mounting assembly;
    at least one connector that couples the enclosure mounting assembly to the support mounting assembly; and
    a drawbridge mechanism including
        a rotatable worm,
        a rotatable gear that engages the rotatable worm,
        at least one drawbridge arm coupled to the rotatable gear, and
        at least one gas spring coupled to the at least one drawbridge arm and the at least one connector, the at least one gas spring providing a counterforce to the enclosure.

2. The vertical motion pendant arm of claim 1 wherein the rotatable worm is vertically positioned.

3. The vertical motion pendant arm of claim 1 and further comprising a vertical shaft that engages the rotatable worm, wherein the vertical shaft includes an adjustment interface.

4. The vertical motion pendant arm of claim 3 wherein the drawbridge mechanism is positioned within the support mounting mechanism and the adjustment interface is accessible from outside of the support mounting mechanism.

5. The vertical motion pendant arm of claim 1 wherein the at least one gas spring provides the counterforce to maintain the vertical motion pendant arm at the desired height.

6. The vertical motion pendant arm of claim 1 wherein the rotatable worm rotates the rotatable gear and the rotatable gear rotates the at least one drawbridge arm.

7. The vertical motion pendant arm of claim 6 wherein the at least one gas spring is coupled to the at least one drawbridge arm at a pivot point that is vertically adjustable by rotation of the drawbridge arm.

8. The vertical motion pendant arm of claim 7 wherein the counterforce is one of increased and decreased when the pivot point is vertically adjusted by rotation of the drawbridge arm.

9. The vertical motion pendant arm of claim 1 wherein the at least one connector includes a top connector and a bottom connector.

10. The vertical motion pendant arm of claim 1 wherein the at least one connector provides a connection channel between the support mounting assembly and the enclosure mounting assembly; and further comprising a first conduit attachment at the support mounting assembly, a second conduit attachment at the enclosure mounting assembly, and a conduit that provides a continuous pathway through the connection channel from the first conduit attachment to the second conduit attachment.

11. The vertical motion pendant arm of claim 1 wherein the enclosure mounting assembly is adapted to be coupled to the enclosure.

12. The vertical motion pendant arm of claim 1 and further comprising a tension adjustment device that provides a frictional resistance to movement of the vertical motion pendant arm.

13. The vertical motion pendant arm of claim 12 wherein the tension adjustment device includes an adjustment knob accessible outside of the vertical motion pendant arm to one of increase and decrease the frictional resistance to movement of the vertical motion pendant arm.

14. The vertical motion pendant arm of claim 1 wherein the rotatable gear includes a first set of teeth and the rotatable worm includes a second set of teeth, wherein the first set of teeth engages the second set of teeth.

15. A vertical motion pendant arm for supporting an enclosure at a desired height, the vertical motion pendant arm comprising:
    a first mounting assembly including a first bottom cover and a first base, the first bottom cover including a first series of holes accessible from outside the first mounting assembly;
    a first rotation mechanism coupled to the first mounting assembly to allow rotation of the first mounting assembly about the first base, the first rotation mechanism including a stop that rotates with the first rotation mechanism; and
    a first removable screw in one of the first series of holes to engage the stop and prevent rotation of the first mounting assembly about the first base past the first removable screw.

16. The vertical motion pendant arm of claim 15 wherein the first series of holes includes holes spaced apart at about 30-degree increments around the first rotation mechanism.

17. The vertical motion pendant arm of claim 15 and further comprising a second mounting assembly including a second bottom cover and a second base, the second bottom cover including a second series of holes accessible from outside the second mounting assembly; a second rotation mechanism coupled to the second mounting assembly to allow rotation of the second mounting assembly about the second base, the second rotation mechanism including a second stop that rotates with the second rotation mechanism; and a second removable screw in one of the second series of holes to engage the stop and prevent rotation of the second mounting assembly about the second base past the second removable screw.

18. The vertical motion pendant arm of claim 15 wherein the first mounting assembly is adapted to be connected to the enclosure.

* * * * *